Jan. 8, 1924.
C. R. MOORE
SUBMARINE SIGNALING
Filed Sept. 19, 1919
1,480,218
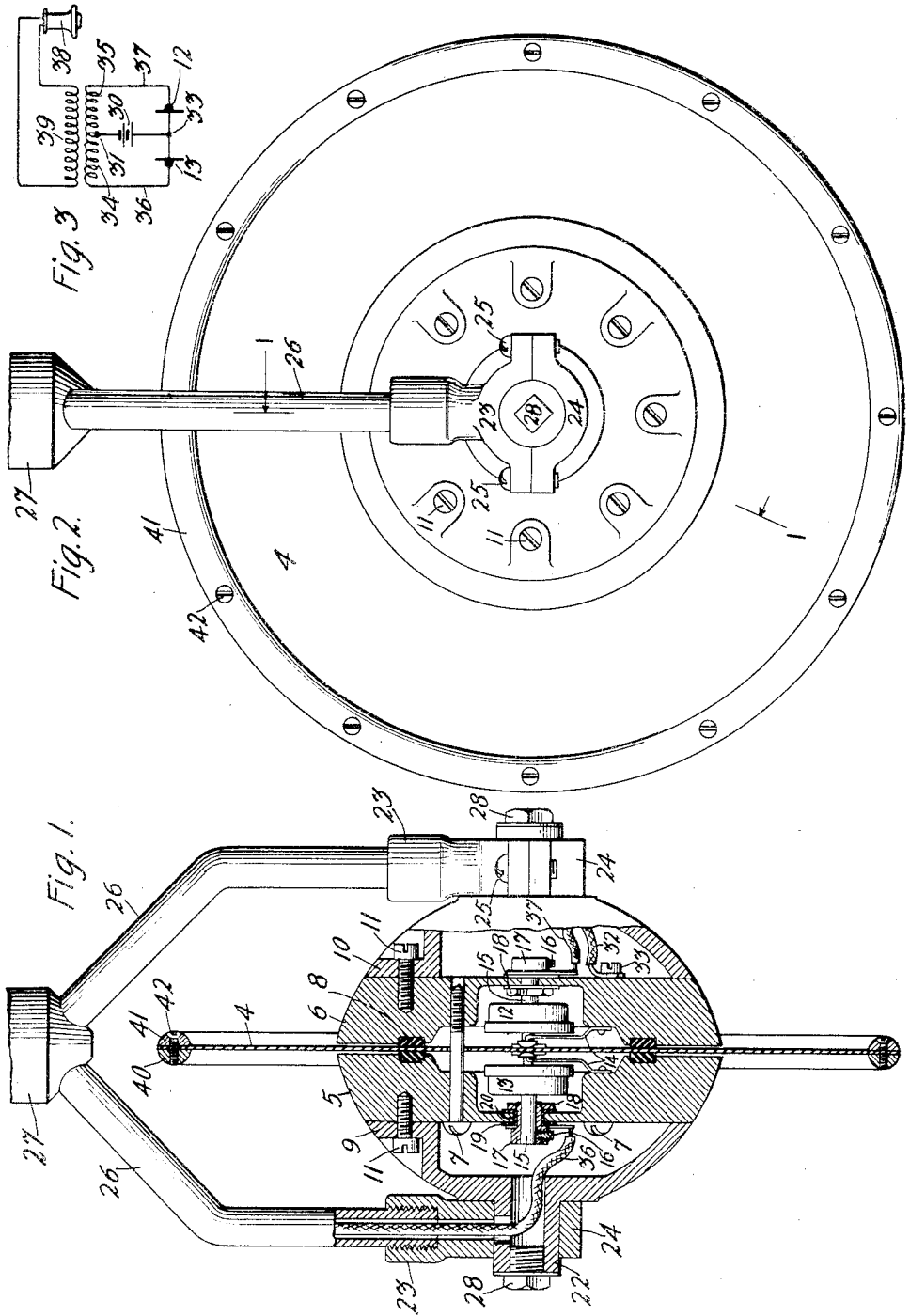
Inventor:
Charles R. Moore.
by J.G.Roberts Att'y.

Patented Jan. 8, 1924.

1,480,218

UNITED STATES PATENT OFFICE.

CHARLES R. MOORE, OF WYOMING, NEW JERSEY, ASSIGNOR TO WESTERN ELECTRIC COMPANY, INCORPORATED, OF NEW YORK, N. Y., A CORPORATION OF NEW YORK.

SUBMARINE SIGNALING.

Application filed September 19, 1919. Serial No. 324,803.

*To all whom it may concern:*

Be it known that I, CHARLES R. MOORE, a citizen of the United States, residing at Wyoming, in the county of Essex and State of New Jersey, have invented certain new and useful Improvements in Submarine Signaling, of which the following is a full, clear, concise, and exact description.

This invention relates to submarine signaling and more particularly to a vibration responsive device adapted for detecting or receiving vibrations set up in the water by submarine signaling apparatus or by the movement of submarine vessels and determining the direction from which such vibrations are propagated.

In connection with receiving apparatus for use in submarine signaling systems and also similar apparatus used for detecting the presence of submarines, it is not only required to determine the proximity of the vessel or source of signaling but also to determine its direction, at least approximately. A high degree of sensitivity is essential in order to detect the faint vibrations in the water and it is of importance that this high sensitivity be maintained when the apparatus is submerged at different depths below the surface of the water and also when there is a constant change in head due to the action of the waves.

It is the object of the present invention to provide a vibration responsive device which is unidirectional, that is, one which may be rotated about a vertical axis and by noting the difference in the volume of the sound picked up, one may determine when the diaphragm of the device is perpendicular to the direction of the source of sound.

It is a further object of this invention to provide such a device in which the vibrating diaphragm is exposed to the water on both sides so that it is unaffected by the hydrostatic pressure when submerged at various depths and is also unaffected by continual variation or change of head.

A still further object is to provide such a structure in which it is possible to employ a standard type of current varying device.

To accomplish these objects and in accordance with a feature of the invention, there is provided a vibration responsive element in the form of a diaphragm or plate which is supported intermediate its center and periphery whereby vibrations in one direction of the peripheral portion are translated into vibrations in the opposite direction of the central portion. In accordance with a related feature of the invention, a current-varying means is mounted in operative relation to the diaphragm within the point of support of the diaphragm, whereby both surfaces of the part of the diaphragm outside of said support are subjected to the vibrations it is desired to detect.

Also in accordance with another feature of the invention, the mounting of the diaphragm is such that a considerable portion of its area on both sides is exposed to the action of variations in pressure in the medium in which it is inserted. By virtue of the arrangement, variations in pressure which are equal on both sides of the diaphragm are balanced and are without effect on the diaphragm.

These and other features of the invention may be more clearly understood by reference to the accompanying drawing in which Fig. 1 is a view partially in section taken along the lines 1—1 of Fig. 2 and looking in the direction of the small arrows; Fig. 2 shows a side elevation of the device shown in Fig. 1; and Fig. 3 shows, diagrammatically, the circuit connections for the device.

Referring now to the drawings, there is disclosed a sheet metal diaphragm 4 securely clamped by means of clamping plates 5 and 6 which are drawn together by means of a plurality of clamping screws 7—7 passing through suitable perforations provided in the diaphragm 4. Rings 8—8 of soft rubber are provided, as shown, to serve as gaskets, thereby preventing water from entering the interior and they also serve as a fulcrum for the diaphragm. Cup-shaped end plates 9 and 10 are secured to the clamping plates 5 and 6 respectively, by means of screws 11—11, suitable indentations being provided in the end caps to receive the heads of these screws. Mounted within the hollow chambers formed in the central portion of the clamping plates 5 and 6 are microphone buttons 12 and 13 which are of the well-known form and have their front electrodes held under tension against the center of the diaphragm by means of the damping springs 14—14. The stems 15—15 of these buttons are secured by means of screws 16—16 to the shouldered bushings 17—17 which in turn are secured to the clamping plates by means of the nuts 18—18. Insulating washers 19—19 and insulating bushings 20—20 of hard rubber or similar material are provided to insulate the stems 15—15 of the buttons from the clamping plates. Each of the end plates 9 and 10 is provided with a hollow hub portion 22 which is securely clamped between members 23 and 24 by means of the screws 25—25. Into each of the members 23, there is threaded a tube member 26 which is bent, as shown, and secured to a pipe 27 by means of which the device is supported in the water. If desired, tubes 26 may be of rubber or other flexible material in order to prevent vibration of the mounting from effecting the operation of the device. Plug screws 28—28 are provided to close the ends of hub portions 22. The electrical conductors for this device are threaded through the pipe 27, tubes 26 and hub portions 22, as shown, and connected to the buttons in the manner shown in Fig. 3. With the connections made as shown, the buttons operate in the manner commonly referred to as the "push-pull." A battery or other source of energy 30 has one of its terminals connected to the mid-point of a split primary winding while its other terminal is connected by means of a conductor 32 to a contact screw 33 which is common to the front electrodes of both buttons. The outer ends 34 and 35 of the primary winding are connected by means of conductors 36 and 37 to the insulated stem portions of the buttons. A receiver 38 or some type of indicating device is connected in series with the secondary 39 of the induction coil and responds to changes in resistance of the transmitter buttons.

Upon the device being submerged in water, the outer portion of the diaphragm is in the direct path of vibrations transmitted through the water and is caused to vibrate back and forth about its fulcrum. Vibrations which would cause the outer portion to vibrate to the left would cause the inner portion to vibrate to the right and under such a condition the resistance of the transmitter button 12 would be decreased, while the resistance of transmitter button 13 would be correspondingly increased. As a result of the arrangement of connections shown in Fig. 3, the effect of the change in resistance of the two buttons is made accumulative and gives a maximum variation in the secondary circuit in which the receiver 38 or other indicating device is connected. In order to prevent free vibration of the outer portion of the diaphragm at its natural frequency, a two-part ring is provided at the perimeter of the diaphragm, this ring consisting of two members 40 and 41 clamped together by means of screws 42. By using clamping rings of different weights, it is possible to alter the natural period of the outer portion of the diaphragm so that it will be particularly responsive to vibrations of the frequency it is desired to detect. When the device is turned so that the plane of the diaphragm is parallel to the direction of the source of sound, the vibration of the diaphragm is at a minimum, whereas, when the diaphragm is perpendicular to the source of sound, its vibration is at a maximum. Hence by rotating the device about a vertical axis, it is possible to determine quite closely the line of the direction of the source of sound.

What is claimed is:

1. A vibration responsive device comprising a vibrating diaphragm, a non-vibrating housing clamped about the central portion of the diaphragm, the outer portion of said diaphragm extending outside of said housing and means within the housing to alter the electrical characteristics of a circuit upon vibration of the diaphragm.

2. A vibration responsive device comprising a vibrating diaphragm, a non-vibrating two-part housing clamped about the central portion of the diaphragm, the outer portion of said diaphragm extending outside of said housing and means within the housing on either side of the diaphragm to alter the electrical characteristics of a circuit upon vibration of the diaphragm.

3. A vibration responsive device comprising a vibrating diaphragm, a non-vibrating two-part housing clamped about the central portion of the diaphragm, the outer portion of said diaphragm extending outside of said housing and means within the housing on either side of the diaphragm to vary the resistance of an electrical circuit upon vibration of the diaphragm.

4. A vibration responsive device comprising a vibrating diaphragm, a non-vibrating two-part housing clamped about the central portion of the diaphragm, the outer portion of said diaphragm extending beyond the housing and a transmitter button mounted within the housing on either side of the diaphragm and in operable relation therewith to change the resistance of an electrical circuit upon vibration of the diaphragm.

5. A vibration responsive device comprising a diaphragm, a two-part housing clamped about the central portion of the diaphragm, the outer portion of said diaphragm extending beyond said housing whereby the portion within the housing vibrates in a direction opposite to that of the outer portion, and means within the housing operable upon vibration of the diaphragm to alter the electrical characteristics of a circuit.

6. A vibration responsive device comprising a diaphragm, a two-part housing clamped about the central portion of the diaphragm whereby the portion within the housing vibrates in a direction opposite to that of the outer portion, means mounted upon the periphery of the diaphragm for altering the natural period of the outer portion of the diaphragm, and means within the housing operable upon vibration of the diaphragm to alter the electrical characteristics of a circuit.

7. A vibration responsive device comprising a diaphragm, a two-part housing clamped about the central portion of the diaphragm whereby the portion within the housing vibrates in a direction opposite to that of the outer portion, a ring member secured to the perimeter of the diaphragm, and means within the housing operable upon vibration of the diaphragm to alter the electrical characteristics of a circuit.

8. A vibration responsive device comprising a diaphragm, means mounted upon the periphery of said diaphragm for altering the natural period of the outer portion of said diaphragm, means for supporting said diaphragm with opposite surfaces exposed to vibrations, and means for varying the characteristics of an electrical circuit operated from said diaphragm.

9. In a vibration responsive device, the combination of a vibration responsive element in the form of a plate, means mounted upon the periphery of said plate for altering the natural period of the outer portion of said plate, means for supporting said plate intermediate its center and periphery with opposite surfaces of its outer portion exposed to vibrations, and current-varying means in operative relation to the central portion of said plate.

In witness whereof, I hereunto subscribe my name this 7th day of August, A. D. 1919.

CHAS. R. MOORE.